Figure 1:
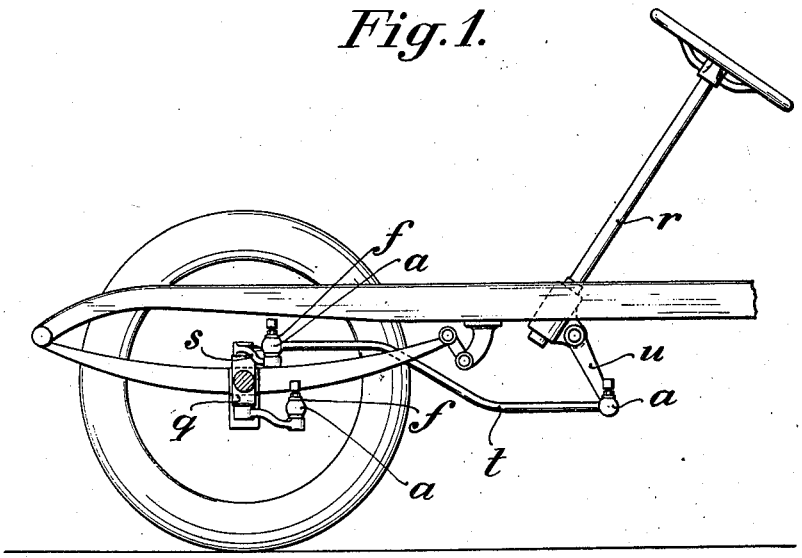

Dec. 30, 1924.　　　　　　　　　　　　　　　　1,520,862
F. FAUDI
SPHERICAL JOINT
Filed April 25, 1924

Inventor
Fritz Faudi
by [signature]
Attorney

Patented Dec. 30, 1924.

1,520,862

UNITED STATES PATENT OFFICE.

FRITZ FAUDI, OF DUSSELDORF-OBERKASSEL, GERMANY.

SPHERICAL JOINT.

Application filed April 25, 1924. Serial No. 708,955.

*To all whom it may concern:*

Be it known that I, FRITZ FAUDI, a citizen of the German Republic, and residing at Dusseldorf-Oberkassel, Germany, have invented certain new and useful Improvements in Spherical Joints (for which I have filed application in Germany October 7, 1922, and January 12, 1923), of which the following is a specification.

My invention relates to improvements in spherical joints, and more particularly in joints of the type in which one of the members to be connected is provided with a cylindrical socket having a pair of bushings fitted therein, which bushings provide a seat for the spherical head of the other member. One of the objects of the improvements is to provide a joint of this class in which exact coaxial position of the said bushings is insured. Another object is to provide for improved lubrication of the joint. With these objects in view my invention consists in providing the bushings with smooth cylindrical surfaces fitting in a socket having a corresponding smooth cylindrical surface, the bushings being forced into the socket by heavy pressure. Further, the spherical member fitted in the bushings is formed with a socket communicating with a receptacle containing a lubricating medium and providing a container for the lubricating medium.

For the purpose of explaining the invention an example embodying the same has been shown in the accompanying drawing in which the same reference characters have been used in all the views to indicate corresponding parts. In said drawing, Fig. 1 is an elevation showing the front part of the chassis of a vehicle in which the steering gear is provided with my improved joint, and Fig. 2 is a detail view on an enlarged scale and partly in section showing the improved joint.

The importance of my improved joint is particularly conspicuous in gears provided in motor vehicles, and I shall describe the same in connection with the steering gear of an automobile. But I wish it to be understood that my invention is not limited to the use in automobiles.

As shown in Fig. 1 the steering gear of the automobile comprises the usual steering knuckle $q$ and a steering pole $r$ connected with each other by an arm $s$, a link $t$, and an arm $u$ as is known in the art, the link being connected with the arms $s$ and $u$ by my improved joint.

Figure 2:
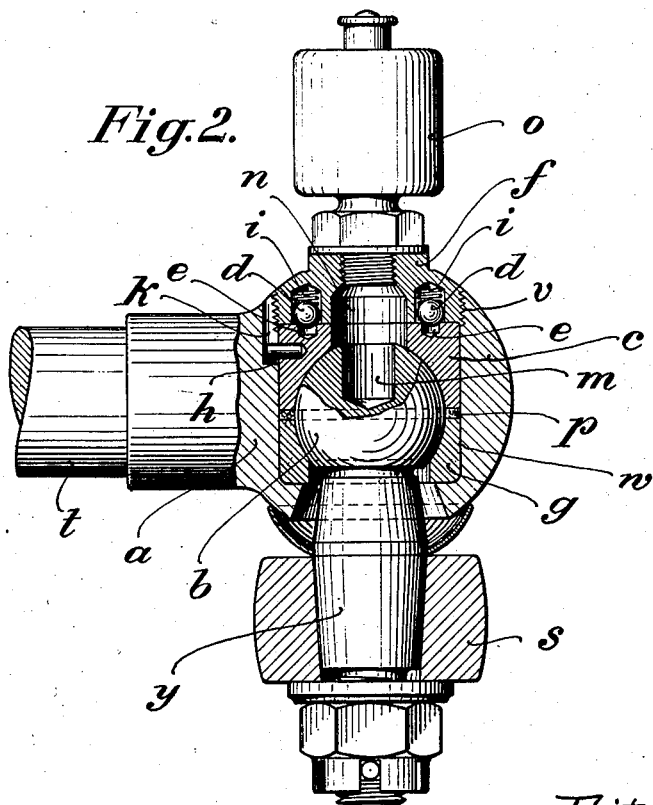

As shown in Fig. 2 a bolt $y$ is fixed to the arm $s$ and provided with a spherical head $b$. To the link $t$ a head $a$ is secured which is formed with a cylindrical socket $w$ having smooth walls, and which is open at its bottom to permit the passage of the bolt $y$ therethrough. Within the socket there are bushings $c$ and $g$ having smooth outer walls, and which are forced into the socket by heavy pressure. The bushings show spherical inner faces providing a bearing for the spherical head $b$. To the upper bushing $c$ a pin $h$ is secured which engages in a groove $k$ made in the head $a$ and locks the bushing as against rotation. At its top the socket is provided with a screw-threaded portion $v$ receiving a plug $f$. In sockets $i$ of the plug there are spring pressed balls $d$ adapted for engagement with sockets $e$ provided in the bushing $c$ for locking the plug $f$ as against unscrewing. It will be understood that sockets $e$ are disposed all around the bushing to permit exact adjustment of the plug.

By providing the socket $w$ and the bushings $c$ and $g$ with smooth cylindrical faces and assembling the parts by pressure in the manner described the exact coaxial position of the spherical faces of the bushings is insured.

The plug $f$ is formed with an axial opening $n$ which is screw-threaded at its outer part for having a lubricating cup $o$ screwed thereto. The head $b$ shows an axial socket $m$ in position for receiving the lubricating medium discharged from the cup $o$, for gradually supplying the said medium to the spherical bearing faces of the bushings and the head $b$. Between the bushings $c$ and $g$ there is a packing ring $p$ of felt or the like controlling the flow of the lubricating medium to the bottom part of the head $b$ and the bushing $g$. This packing ring $p$ serves a threefold purpose: it controls the lubrication, it allows of controlling the contact pressure between the spherical head and the bushings, and it is used for compensating the wear of these parts.

In the operation of the joint the socket $n$ is filled with the lubricating medium which is gradually transmitted by the oscillation of the joint to the bearing faces of the head $b$ and the bushing $c$. By means of the packing ring $p$ the lubricating medium is gradually transmitted to the bottom part of the head $b$ and the bushing $g$, and any waste of lubricating medium is avoided. The socket $m$ provides a storage chamber for the lubricating medium which insures lubrication of the joint for a certain length of time after the cup $o$ has been exhausted.

While in describing the invention reference has been made to a particular example embodying the same I wish it to be understood that my invention is not limited to the construction shown in the drawing, and that various changes may be made in the general arrangement of the joint and the construction of its parts without departing from the invention.

I claim:

1. A ball and socket joint of the type set forth, comprising in combination with a machine part, a spherical pivot fixed to said machine part and presenting in its top portion a lubricant chamber, a second machine part presenting a chambered head, two bushings in complemental disposition in said head chamber for journaling between them said spherical head, means for preventing relative rotary displacement between the upper bushing and said head, resilient packing and spacing means interposed between said two bushings, an axially perforated closure cap for said head chamber screwing into said second machine part, and said cap and said packing and spacing means jointly serving for securing said bushings in their proper position, for controlling the lubrication between bushings and pivot, for controlling the operative pressure between said bushings and said pivot, and for compensating the wear of the movable cooperating surfaces of said pivot and said bushings, a lubricating device associated with said screw cap for feeding a lubricant through said cap and said upper bushing to the outer surface of said pivot and to said pivot chamber, and means interposed between said upper bushing and said cap for preventing unintentional loosening of the latter.

2. In a ball and socket joint according to claim 1, spring-influenced ball and cup means interposed in interspaced annular arrangement between said upper bushing and said cap, for preventing the latter from becoming unintentionally unscrewed.

In testimony whereof I affix my signature.

FRITZ FAUDI.